April 24, 1956 A. C. SCHROEDER ET AL 2,743,310

COLOR TELEVISION

Filed Dec. 14, 1953 3 Sheets-Sheet 1

INVENTORS
WALTER G. GIBSON AND
ALFRED C. SCHROEDER
BY [signature]
ATTORNEY

INVENTORS
WALTER G. GIBSON AND
ALFRED C. SCHROEDER
BY Olin A. Mitchell
ATTORNEY

INVENTORS
WALTER G. GIBSON AND
ALFRED C. SCHROEDER
BY [signature]
ATTORNEY

United States Patent Office 2,743,310

Patented Apr. 24, 1956

2,743,310

COLOR TELEVISION

Alfred C. Schroeder, Huntingdon Valley, Pa., and Walter G. Gibson, Princeton, N. J., assignors to Radio Corporation of America, a corporation of Delaware Application December 14, 1953, Serial No. 397,960

9 Claims. (Cl. 178—5.4)

The present invention relates to color television systems and, more particularly, to apparatus for developing and employing correcting signals to compensate for non-linearities of the image pickup and reproducing apparatus.

In order that the present invention may be appreciated in its proper environment in a color television system, certain broad principles should be understood. In accordance with the presently proposed standards of the National Television System Committee (NTSC), the television signal which is transmitted consists of a luminance signal and two color difference signals. The luminance signal is made up of predetermined proportions of the signals representing a plurality, selected component colors of a subject. The color difference signals are of a character such that, when each is combined with the luminance signal, there is produced a signal representative of one of the component colors which may be employed in this form for image-reproducing purposes.

The color difference signals are transmitted on a subcarrier wave having a frequency which is at the relatively high end of the frequency band of the luminance signal. The subcarrier wave has a frequency which is a large odd multiple of one half of the horizontal scanning frequency. By this means, the side bands of the color sub-carrier wave are interleaved with the discrete energy concentrations of the luminance signal. In view of the fact that one independent piece of information may be carried in the luminance signal, it is necessary to transmit only two color difference signals. The third color difference signal may be derived at the receiver by proper combination of the two transmitted color difference signals.

In transmitting the color difference signals, it is the practice to modulate them respectively on two quadrature phases of the subcarrier wave. Within the frequency range in which both side bands of the color subcarrier wave are transmitted, there is no distortion of the color difference signals. However, since the color subcarrier wave has a frequency which is in the upper region of the pass band of the communication channel, some of the higher frequency color difference modulating signals are transmitted in only one of the color subcarrier wave side bands. In this single side band region, therefore, it is the practice to transmit only a single color difference signal in order to avoid signal distortion due to cross talk.

Generally considered, any two color difference signals may be transmitted by modulating quadrature phases of the subcarrier wave. It is desirable, however, that the subcarrier wave modulating signals be chosen in such a way as to provide the most acceptable image reproduction when only a single difference signal is transmitted in the single side band region. It has been the practice to derive two signals (designated "I" and "Q"), with which to modulate the quadrature phases of the subcarrier wave, which are combinations of two of the color difference signals. Accordingly, at a receiver the color difference signals for proper combination with the luminance signal are derived from the subcarrier wave.

As thus far described hereinabove, the system has been assumed to be linear. In actuality, however, some form of transfer gradient ("gamma") correction must be introduced in order to anticipate the non-linear signal-input vs. light-output characteristics of the image tubes. In the proposed NTSC standards, it is specified that each of the selected component color signals produced by the camera be applied to non-linear apparatus capable of producing a certain degree of "gamma" correction. Since kinescope control characteristics ordinarily approximate a power law such that light output varies as something between the square and the cube of the applied video signal voltage, it is, therefore, specified that the signal output from each of the gamma amplifiers should vary as something between the square root and the cube root of the light input to the camera which feeds it. While a system of that type affords certain advantages, including an improved signal-to-noise ratio by reason of its compression of the dynamic range of the transmitted signals, other investigations have shown that still greater advantages may be realized through the use of a different form of correction. In general, the latter proposal contemplates the transmission of color signals such as the "I" and "Q" signals which are made up of selected component color signals which are not "corrected" for gamma. As will appear from the following portions of the specification, the proposal in question further provides for transmitting the color information in such manner that it has the form of the numerator of an expression which includes the luminance information as its denominator, thereby rendering the subcarrier amplitude independent of the luminance of the scene. The luminance signal which is transmitted with the subcarrier is itself gamma-corrected in accordance with a suitable exponential function.

It is an object of this invention to provide improved gamma correction means for use in conjunction with a complex signal such as is transmitted in a color television system.

It is another object of the present invention to provide novel means for producing a gamma-corrected color television signal.

A further object is the provision of gamma-correction means relatively simple in structure, capable of raising a television signal to a great variety of exponential values.

In general, the present invention may be viewed as to a specific embodiment in the following manner: assuming that it is desired to produce a signal having the form $$E_Y^{\frac{1}{\gamma}}\left[\frac{Q\sin(\omega t+\theta)}{E_Y}+\frac{I\cos(\omega t+\theta)}{E_Y}\right]$$

it would ordinarily be considered necessary, having a source of the signals represented by the numerator portions of the expression within the brackets, to divide that signal by the term $E_Y$ and then to multiply the quotient by $$E_Y^{\frac{1}{\gamma}}$$

The present invention, on the other hand, effects the desired result in a far simpler manner, namely, in accordance with an illustrated embodiment, by passing the $E_Y$ (luminance) signal through a novel gamma amplifier having a characteristic of $$\frac{1-\gamma}{\gamma}$$

Means are also provided for multiplying the output of the $$\frac{1-\gamma}{\gamma}$$

amplifier with the subcarrier modulated Q and I signals, whereby to furnish the desired signal form.

Additional objects and advantages of the present invention will further suggest themselves to persons skilled in the art from a study of the following detailed description of the accompaning drawing, in which.

Figures 1, 3, 4:
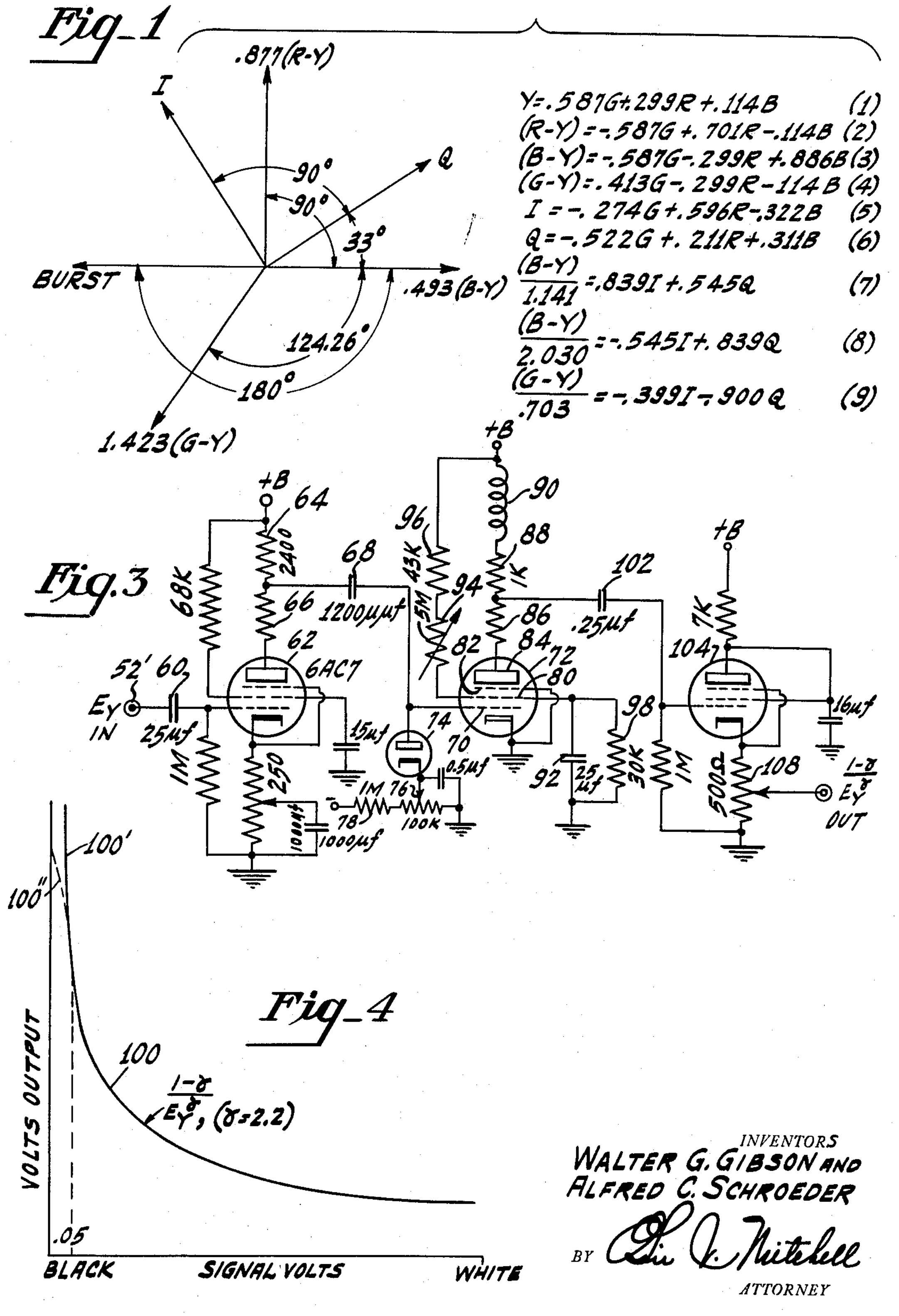
Fig. 1 is a vector diagram together with certain equations representing the relationship of the color difference signals and the color subcarrier wave modulating signals in a system in which the present invention may be embodied.
Fig. 3 is a schematic diagram of a gamma amplifier circuit used in the apparatus of Fig. 2.
Fig. 4 is a curve to be described in connection with the circuit of Fig. 3.

Reference first will be made to Fig. 1 of the drawings for a general description of the color television signalling system in which the present invention is embodied. This figure includes a vector diagram in which the respective red, blue and green color difference signals are represented by the vectors (R—Y), (B—Y) and (G—Y). It will be understood that this vector diagram represents only the angular relationship between the various signals referred to. The illustrated lengths of the vectors are not significant, since these lengths change with different color content of the subject represented by the signals. Also, it will be understood that, with respect to the color difference signals (R—Y), (B—Y) and (G—Y), the representative vectors indicate the angular relationship between such signals if, in fact, the color subcarrier wave were modulated directly by the color difference signals. In this system, however, the color subcarrier wave is not directly modulated by these color difference signals. It will be understood, therefore, that the various representative color difference signals are shown merely for reference purposes. In this connection, it is noted that the burst signal vector is 180° out of phase with the blue color difference signal (B—Y). The burst signal is employed to effect synchronous operation of the color signalling apparatus at the transmitter and receiver. Also, for simplicity, the signals are shown as linear signals.

It also may be noted from the vector diagram of Fig. 1 that the red color difference signal (R—Y) leads in phase the blue color difference signal (B—Y) by 90°. Accordingly, the burst signal leads the red color difference signal (R—Y) by 90°. Furthermore, in accordance with the presently proposed NTSC standards, the system operates by the modulation of the color subcarrier wave directly by two signals designated respectively as the "I" and "Q" signals. From the vector diagram, it may be seen that the "I" signal leads in phase the "Q" signal by 90°. Also, the "I" and "Q" signals lead in phase, respectively, the red color difference signal (R—Y) and the blue color difference signal (B—Y) by 33°.

From the remaining portion of Fig. 1, the different amplitude relationships between the various vectors representing signals shown in this figure are given by the equations. In these equations, it will be understood that the quantities referred to are signal voltages. In order to present the relationships between the various signal voltages as clearly as possible, it will be understood that the various letters and quantities represented by letters grouped together in brackets or parentheses represent the signal voltages indicated by the different letters referring to the different color and the luminance signals. As indicated in Equation 1, the luminance signal "Y" is made up of the algebraic sum of the specified quantities of the green, red and blue signals G, R and B, respectively, representing light of these colors derived from the subject. Also, in Equations 2, 3 and 4, the various color difference signals (R—Y), (B—Y) and (G—Y) are given in terms of the color signals representing the subject. The "I" and "Q" subcarrier wave modulating signals are given in Equations 5 and 6 respectively in terms of the different color signals representing the subject. In addition, the color difference signals (R—Y), (B—Y) and (G—Y) are expressed in Equations 7, 8 and 9 in terms of the "I" and "Q" subcarrier wave modulating signals. These latter relationships, particularly with reference to the signs of the "I" and "Q" signals, may be seen to correspond with the relationships shown in the vector diagram of this figure. The denominators of the left hand terms of these equations are indicative of the amplification which the algebraic sums of the related "I" and "Q" modulating signals should be given in order to produce the proper color difference signals for combination with the luminance signal to develop the proper color signal for image-reproducing purposes.

Insofar as gamma correction is concerned, the February 2, 1953, NTSC specifications provide that the transmitted signal shall be in the form (10)

$$E_S=E_Y'+[E_Q' \sin(\omega t+33°)+E_I' \cos(\omega t+33°)]$$

where $E_Y'$ is the sum of the proportions of $$E_R^{\frac{1}{\lambda}},\ E_B^{\frac{1}{\lambda}} \text{ and } E_G^{\frac{1}{\lambda}}$$

as shown by Equation 1 of the drawing in Fig. 1, and where $E_Q'$ and $E_I'$ are also composed of the proportions of "gamma corrected" primary color signals of Equations 5 and 6.

Other investigators have shown, however, that by making up the signal in the following form, several distinct advantages are obtained:

(11)

$$E_S=E_Y^{\frac{1}{\gamma}}+E_Y^{\frac{1}{\gamma}}\left[\frac{E_Q \sin(\omega t+33°)}{E_Y}+\frac{E_I \cos(\omega t+33°)}{E_Y}\right]$$

These advantages are due primarily to the fact that, by dividing the numerator portions of the uncorrected color subcarrier expressions by the uncorrected brightness signal, the subcarrier is rendered substantially completely independent as to amplitude of any brightness variations. That is to say, if the brightness of a scene increases by a given factor, each of the color signals will also increase by that factor, thereby tending to increase the amplitude of the subcarrier. Division by the brightness signal, however, cancels such brightness-change-induced subcarrier amplitude variations. Specifically, a signal such as that indicated mathematically in Equation 11 affords the following advantages:

(*a*) Improved signal to noise in the brightness channel;

(*b*) Reduced average value of the subcarrier which may, if desired, be used to improve the color signal to noise;

(*c*) The critical nature of hue versus subcarrier phase is reduced somewhat for the complements of the primaries; and (*d*) The signal is independent of the transmitter primaries.

The cited advantages are realized only as a receiver is designed to exploit them but it should be borne in mind that receivers designed to reproduce a color image from a signal of the NTSC specifications will also be capable of satisfactory operation with a signal of the form of Equation 11.

As may be noted from Equation 11, four distinct mathematical manipulations are required, namely, the derivation of the $E_Y$ signal having the exponent $$\frac{1}{\gamma}$$

the division of the subcarrier terms $E_Q$ and $E_I$ by the signal $E_Y$ and the multiplication of the resultant quotient by $$E_Y^{\frac{1}{\gamma}}$$

and, finally, addition of the last-named product with $$E_Y^{\frac{1}{\gamma}}$$

The present invention, in recognition of the complicated apparatus which would be required for performing the above-recited acts in a straightforward manner, affords an extremely simplified modus operandi, the apparatus for which will now be described.

Figure 2:
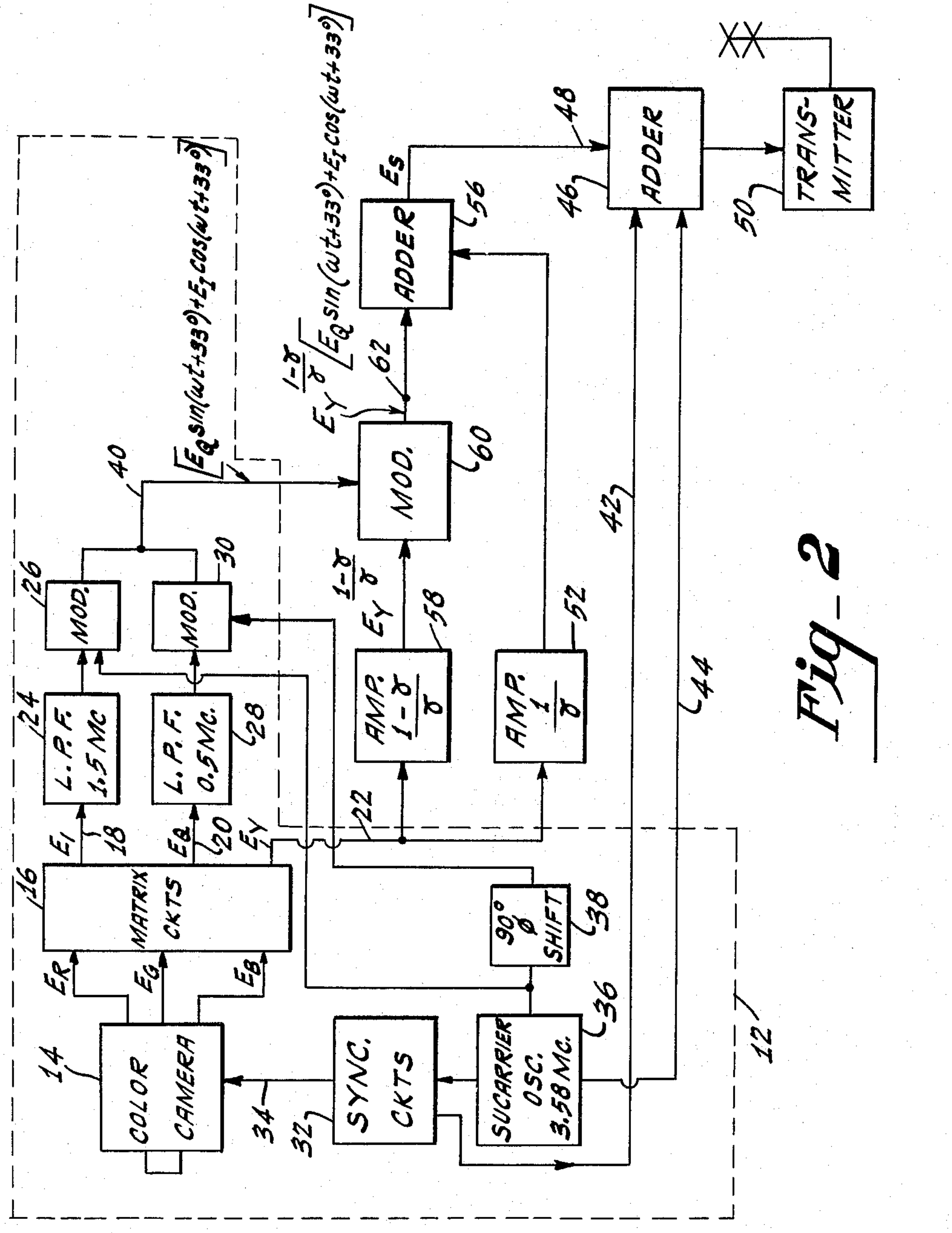
Fig. 2 is a block diagram illustrative of apparatus in accordance with the present invention.

Fig. 2 illustrates a color television transmitter arrangement, much of which is in accordance with well-known conventional techniques. Specifically, that portion of Fig. 2 which is a part of the prior art is contained within the dotted line area designated by reference numeral 12. A color camera 14 of any well-known suitable variety produces, from its scanning of a color scene, three simultaneous color signals $E_R$, $E_G$ and $E_B$ which are applied to matrix circuits 16 in the usual manner for producing at output terminals 18, 20 and 22 the signals $E_I$, $E_Q$ and $E_Y$ whose makeup may be found in Equations 5, 6 and 1, respectively, of Fig. 1. The wide band I signal is passed through a low pass filter 24 and applied to one input terminal of modulator 26, while the narrow band Q signal is passed through the filter 28 prior to a second modulator 30. Synchronizing circuits 32 develop horizontal and vertical synchronizing waveforms for application to the color camera 14 via lead 34. The output of oscillator 36 which may, for example, be a sinusoidal wave having a frequency of 3.58 megacycles, is applied to the second input of modulator 26. The oscillations are passed through a 90° phase shifting device 38 whose output is applied to the second input terminal of modulator 30. Both modulators 26 and 30 may be of the well-known balanced modulator variety and need not be described herein. The outputs of the modulators 26 and 30 are combined at terminal 40 to produce the subscriber signal described by the equation indicated adjacent to that terminal.

Synchronizing pulses of both horizontal and vertical frequencies are coupled via lead 42 together with "color synchronizing bursts" from oscillator 36 via lead 44 to an adder circuit 46. This adder circuit has an additional terminal 48 to which is applied the signal $E_S$ whose derivation involves the present invention. The synchronizing pulses and bursts are thereby added to the signal $E_S$ to produce a composite signal waveform which is then applied to transmitter 50.

As thus far described, the apparatus of Fig. 2 is conventional and a detailed description thereof may be found, for example, in an article entitled "Principles and Development of Color Television Systems" by G. H. Brown and D. G. C. Luck, RCA Review, June 1953. As thus described, moreover, the apparatus of Fig. 2 produces the color information in the form $E_I$ and $E_Q$ and the luminance signal $E_Y$, all composed of various proportions of the original primary color signals $E_R$, $E_G$ and $E_B$ which are substantially linear (i. e., not corrected for "gamma").

Since the first term of Equation 11 is $$E_Y^{\frac{1}{\gamma}}$$

the luminance signal $E_Y$ is applied to a gamma amplifier 52 having the $$\frac{1}{\gamma}$$

characteristic. Gamma amplifier 52 may be of any suitable form, the specific circuitry of which does not constitute a part of the present invention. Thus, there is available at lead 54 the gamma corrected brightness signal which is applied to one input terminal of adder circuit 56.

The remaining portion of Equation 11 is in the following form:

$$E_Y^{\frac{1}{\gamma}}\left[\frac{E_Q \sin}{E_Y}\,(\omega t+33°)+\frac{E_I}{E_Y}\cos\,(\omega t+33°)\right]$$

Applicants have found that this part of the signal may be readily produced in a much simpler manner than that indicated mathematically. Specifically, by factoring the denominator $E_Y$ from within the brackets, the expression may be written as follows:

$$\frac{E_Y^{\frac{1}{\gamma}}}{E_Y}\,[E_Q \sin\,(\omega t+33°)+E_I \cos\,(\omega t+33°)]$$

This expression may be further simplified by dividing $$E_Y^{\frac{1}{\gamma}}$$

by $E_Y$ to produce the equation $$E_Y^{\frac{1-\gamma}{\gamma}}$$

This last-named term may be produced by means of gamma amplifier 58 having the characteristic $$\frac{1-\gamma}{\gamma}$$

the specific circuitry of which will be described hereinafter. The output of amplifier 58 is applied to one input terminal of a multiplying circuit or modulator 60 whose other input terminal receives the chrominance signal from terminal 40. The product of the two input signals of modulator 60 is indicated by the equation at its output terminal 62 and this is supplied to the input of adder circuit 56 for addition with the gamma corrected brightness signal. Thus, the output of adder 56, namely, $E_S$, has the form necessary for combination with the synchronizing information in adder 46, as above described.

Fig. 3 illustrates a circuit suitable for use in the block 58 for raising $E_Y$ to the exponential power $$\frac{1-\gamma}{\gamma}$$

While circuit components are assigned specific values in Fig. 3 illustrative of one operative embodiment, it should be understood that the values shown are not intended as by way of limitation. Input terminal 52′ receives the luminance signal $E_Y$ from terminal 22 of the matrix circuit and applies this signal via capacitor 60 to the control electrode of a conventional amplifier pentode 62 which has a load resistor 64 and an additional resistor 66 in its anode circuit for suppressing parasitic oscillations. The amplified luminance signal $E_Y$ is coupled via capacitor 68 to the control electrode 70 of the transfer gradient amplifier pentode 72, which is of the remote cutoff type. A clamping device is provided in the form of a diode 74 whose anode is connected to the control electrode of tube 72 and whose cathode is adjustably connected via slider tap 76 to a selected point on potentiometer 78. The function of clamping diode 74 is that of restoring the direct current component to the luminance signal, which action is necessary in view of the nonlinearity of gamma amplifier 72. That is to say, as those skilled in the art will understand, the D. C. component of the incoming signal must be established in order for properly uniform gamma correction to be realized. The gamma amplifier further includes a screen grid 80, suppressor grid 82 and anode 84, the last-named element being connected through a parasitic suppressor resistor 86, load resistor 88 and shunt peaking coil 90 to a source of positive potential indicated as +B. The screen grid 80 is bypassed to ground through a suitable capacitor 92 and receives the direct current operating potential through a variable resistor 94 and fixed resistor 96 from +B. A resistor 98 is also connected between the screen grid 80 and a point of fixed potential (e. g., ground) for the purpose of preventing the screen voltage from varying widely as a function of low frequency bias changes of the control grid 70. By suitably selecting the setting of grid bias tap 76 on potentiometer 78 and by selecting a proper value for the variable screen voltage dropping resistor 94, the gamma amplifier pentode may be caused to provide the characteristic of the curve 100 of Fig. 4. As indicated in Fig. 4, curve 100, which is a plot of voltage output as a function of signal voltage input, is a graphic representation of the function $$\frac{1-\gamma}{\gamma}$$

where gamma, in the illustrative embodiment, is equal to 2.2. Although the theoretical gamma characteristic is asymptotic to the ordinate axis as shown by the solid line extension 100′, the actual curve which may be realized through the gamma amplifier 72 is more nearly that shown by the dotted line portion 100″. Assuming, however, a contrast ratio of 20:1, the useful portion of the curve is that which extends from "White" to about 5% which, as may be seen from the drawing, includes that portion of curve 100 which is substantially the theoretical characteristic.

The output of gamma amplifier 72 is applied via capacitor 102 to the control electrode of a conventional output amplifier 104 having an output terminal 106 adjustably connected to its cathode resistor 108.

Figure 5:
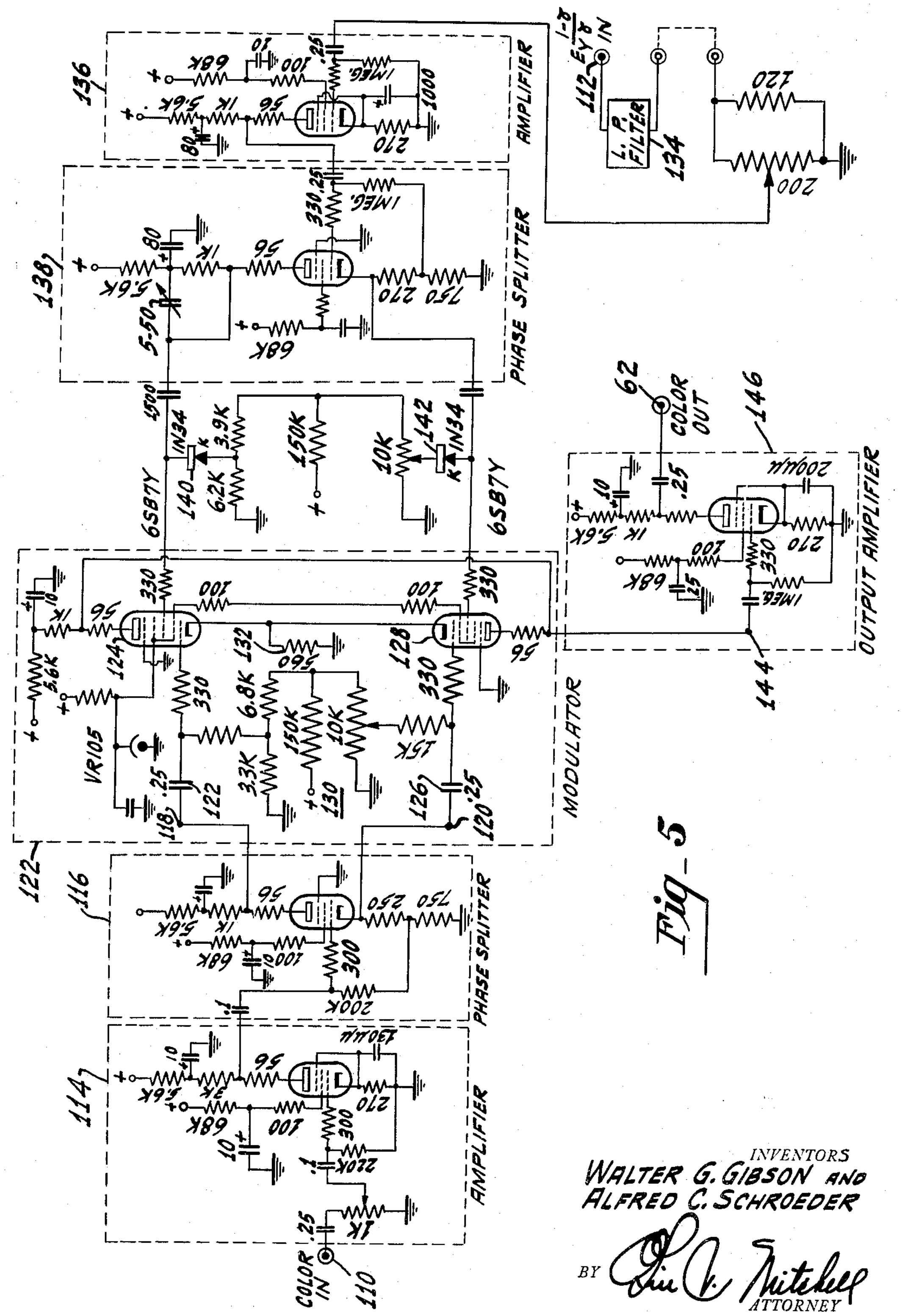
Fig. 5 illustrates, by way of schematic diagram, a circuit for multiplying signals as employed herein.

As has been stated supra, the signal expression $$E_Y\frac{1-\gamma}{\gamma}$$

must be multiplied with the chromaticity information available at terminal 40 at the apparatus of Fig. 2, and this mathematical action is performed by the modulator 60. Fig. 5 illustrates, by way of a schematic diagram, circuitry which is suitable for the multiplication function indicated by block 60 of Fig. 2. More specifically, the apparatus of Fig. 5 includes two input terminals 110 and 112 to which the color and brightness signals are applied, respectively. The color signal at terminal 110 is amplified by a conventional circuit indicated by dotted line box 114 and is applied to a phase splitter 116 of well known form, which latter circuit provides opposite polarities of the color signal at terminals 118 and 120 of the balanced modulator 122. Terminal 118 is coupled through a capacitor 122 to a first control electrode of a pentagrid tube 124, while terminal 120 is coupled via capacitor 125 to the corresponding electrode of a second pentagrid tube 128. The biasing for the two control electrodes is balanced by means of the variable potentiometer network 130, in a well known manner. The cathodes of both tubes 124 and 128 are joined and connected to ground through a resistor 132. The luminance signal having the exponent $$\frac{1-\gamma}{\gamma}$$

is applied from terminal 112 through a low pass filter 134 to the input of a conventional amplifier 136 whose output is applied to a phase splitter 138 which may also be of a conventional form such as that illustrated. Opposite polarities of the gamma-correct luminance signal are clamped by diodes 140 and 142 and applied to the number 3 grids of the two modulators 124 and 128. The grids number 2 and 4 of each of the tubes 124 and 126 are connected to positive potential sources, while their anodes are connected to each other and to the input terminal 144 of an output amplifier 146. Since the operation of a balanced modulator such as that shown in Fig. 5 is now familiar to those skilled in the art, it need not be described in detail herein, beyond mention of the fact that its function is that of multiplying the two input signals in such manner as to provide at terminal 144 the product of the two signals without either of the signals themselves being present at that point. Hence, after amplification by the circuit 146, the signal available at terminal 62 has the form indicated in Fig. 2 at the corresponding terminal.

Hence, it will be appreciated that the apparatus of Fig. 5 performs its service of providing the product of the chrominance signal and the luminance signal $$E_Y\frac{1-\gamma}{\gamma}$$

which is then added in circuit 56 to the gamma-corrected luminance signal $$E_Y^{\frac{1}{\gamma}}$$

to provide the desired signal having the form shown by Equation 11. While specific circuits together with the values of components are shown in Fig. 5, it should be understood that the circuits illustrated are intended only to show one operative embodiment.

From the foregoing, it will be appreciated that the present invention affords a relatively simple (compared to what the straightforward mathematical actions of Equation 11 indicate) apparatus for providing such a signal wherein gamma correction is performed on the brightness or luminance signal itself and not on the selected primary color signals.

Having thus described our invention, what we claim as new and desire to secure by Letters Patent is:

1. Television signal generating apparatus which comprises a source of a plurality of substantially linear electrical video signals, each representative of a selected component color, matrix means coupled to said source for deriving a selected combination of such linear component color signals and for producing a linear luminance signal therefrom; a source of carrier wave; means operatively connected to said matrix means and said wave source for modulating said carrier wave with said selected combination of component color signals; a non-linear signal translating circuit having an inverse power law characteristic; a signal multiplying circuit; means for applying said linear luminance signal from said matrix means to said non-linear circuit whereby to produce a luminance signal having said inverse power law characteristic; and means for applying said non-linear luminance signal and said modulated carrier wave to said multiplying circuit in such manner as to produce a composite signal equal to their product.

2. Television signal generating apparatus which comprises: a source of substantially linear electrical video signals, each representative of a selected component color; matrix means coupled to said source for deriving a selected combination of such component color signals and for producing a linear luminance signal from said component color signals; oscillator means for generating a sinusoidal carrier wave; means operatively connected to said matrix means and said oscillator means for modulating said carrier wave with said selected combination of component color signals; a first non-linear signal translating circuit having an inverse power law characteristic; a second non-linear signal translating circuit having an inverse power law characteristic different from that of said first circuit; a signal multiplying circuit; means for applying said linear luminance signal to said first non-linear circuit whereby to produce a luminance signal having the non-linear characteristic thereof; means for applying said linear luminance signal from said matrix means to said second non-linear circuit whereby to produce a luminance signal having the non-linear characteristic thereof; and means for applying said modulated carrier wave and one of said non-linear luminance signals to said multiplying circuit in such manner as to produce a composite signal equal to their product.

3. Television apparatus for producing an electrical signal of the form $$f(E_Y)\left[\frac{A\sin(\omega t+\theta)}{E_Y}\right]$$

where $f(E_Y)$ is a function of a video signal $E_Y$, which comprises: a source of sinusoidal color signal having the form A sin $(\omega t+\theta)$; a source of video signals $E_Y$; signal translating apparatus having a non-linear translating characteristic of the form $$\frac{f(E_Y)}{E_Y}$$

means for applying video signals $E_Y$ from said source to said non-linear apparatus; signal multiplier means having two inputs and an output terminal; means for applying such sinusoidal color signals to one of said multiplier input terminals; and means for applying video signals from said source to the other of said multiplier input terminals in such manner that said multiplier means produces at its output terminal a signal in the form of the mathematical product $$\frac{f(E_Y)}{E_Y}[A\sin(\omega t+\theta)]$$

4. The invention as defined by claim 1 wherein said non-linear circuit comprises an amplifier circuit having a signal transfer characteristic of the form $$\frac{1-\gamma}{\gamma}$$

where $\gamma$ is a value greater than unity.

5. The invention as defined by claim 1 wherein said inverse power law characteristics circuit comprises an electron tube circuit having an anode and first and second electrodes and means for biasing each of said electrodes in such manner as to provide said tube with an input-vs.-output gain characteristic of the form $$\frac{1-\gamma}{\gamma}$$

where $\gamma$ is a value greater than unity.

6. The invention as defined by claim 5 wherein said electron tube comprises a remote cutoff device and wherein said first and second electrodes comprise its control electrode and screen electrode, respectively.

7. The invention as defined by claim 6 including means for establishing a direct current component in a signal applied to said control electrode.

8. Television apparatus for producing a composite electrical signal of the form $$E_Y^{\frac{1}{\gamma}}\left[\frac{E_Q}{E_Y}\sin(\omega t+\theta)+\frac{E_i}{E_y}\cos(\omega t+\theta)\right]$$

where $E_Y$, $E_Q$ and $E_I$ are substantially linear and $\lambda$ is a value greater than unity, which comprises: a source of video luminance signal $E_Y$; a source of color signals in the form $[E_Q\sin(\omega t+\theta)+E_I\cos(\omega t+\theta)]$; a non-linear signal translating circuit having a characteristic defined by the power $$\frac{1-\gamma}{\gamma}$$

a signal multiplying means having two input terminals and an output terminal; means for applying luminance signals from said source to said non-linear circuit whereby to produce a non-linear luminance signal having the form $$E_Y\frac{1-\gamma}{\gamma}$$

means for applying such non-linear luminance signal to one of said multiplier input terminals; and means for applying color signals from said source to the other input terminal of said multiplier means, whereby to produce said composite signal at its output terminal.

9. The invention as defined by claim 8 including a second non-linear signal translating circuit having a characteristic defined by $$\frac{1}{\gamma}$$

means for applying linear luminance signals from said source to said circuit having a characteristic of $$\frac{1}{\gamma}$$

and adder means coupled to said $$\frac{1}{\gamma}$$

circuit and said output terminal of said multiplier means.

References Cited in the file of this patent

UNITED STATES PATENTS

| | | |
|---|---|---|
| 2,627,547 | Bedford | Feb. 3, 1953 |
| 2,654,798 | Herbst | Oct. 6, 1953 |